Oct. 9, 1928.

R. F. MORRISON ET AL 1,686,759

PLASTIC CANDY FORMING MACHINE

Filed Aug. 12, 1925

Oct. 9, 1928.  
R. F. MORRISON ET AL  
1,686,759  
PLASTIC CANDY FORMING MACHINE  
Filed Aug. 12, 1925  
7 Sheets-Sheet 4

Oct. 9, 1928. 1,686,759
R. F. MORRISON ET AL
PLASTIC CANDY FORMING MACHINE
Filed Aug. 12, 1925 7 Sheets-Sheet 5

Fig.6.

Inventors:
Robert F. Morrison.
Earl B. Elder.
George E. Mueller Atty.

Oct. 9, 1928.

R. F. MORRISON ET AL

1,686,759

PLASTIC CANDY FORMING MACHINE

Filed Aug. 12, 1925    7 Sheets-Sheet 6

Inventors:
Robert F. Morrison.
Earl B. Elder.
George E. Mueller Atty.

Oct. 9, 1928.

R. F. MORRISON ET AL 1,686,759

PLASTIC CANDY FORMING MACHINE

Filed Aug. 12, 1925      7 Sheets-Sheet 7

Inventors:
Robert F. Morrison.
Earl B. Elder.
George E. Mueller   Atty.

Patented Oct. 9, 1928.

1,686,759

UNITED STATES PATENT OFFICE.

ROBERT F. MORRISON AND EARL B. ELDER, OF OAK PARK, ILLINOIS, ASSIGNORS TO EMIL J. BRACH, OF CHICAGO, ILLINOIS.

PLASTIC-CANDY-FORMING MACHINE.

Application filed August 12, 1925. Serial No. 49,754.

Our invention relates to plastic candy forming machines and has to do more particularly with machines of this character adapted to operate upon a continuous strip of candy in the nature of a candy rope, such as is formed up for making filled candies with soft centers and hardened shells.

There are various features to our invention, one of them being the provision of a machine of the above character carrying a plurality of individual or unit presses adapted to be successively applied to a continuous candy rope, and in which the parts cooperate so as to draw to one side in passing the rope as they move through their circuit and then move back over the rope to compress the same into the formed pieces. They then continue onwardly and automatically open to drop the formed candies and again move to one side to pass the rope and then come back into operative position.

Another feature of our invention is the knock-out mechanism, that is means provided to strike the mold so as to force any of the candies out that might stick or adhere to the dies, or plow them to one side.

There are various other features to our invention and these will be referred to more particularly in the ensuing portion of our specification and the appended claims.

For a better understanding of our invention reference is to be had to the accompanying drawings, in which—

Referring now more in detail to the machine illustrated, a suitable frame A is employed having sides 15—16 and overhead yokes 17—18 and lower or base pieces 19—20 extending between the side frames.

Supported in this frame is the die or press carrying mechanism, which includes a pair of sprockets 21—22 at the head end and a like pair of sprockets 23—24 at the foot end. The head sprockets 21—22 are carried upon a hub 25 secured to a supporting shaft 26 rotatably carried in suitable bearings 27. Sprockets 23—24 are carried upon a driving shaft 28 rotatably supported in suitable bearings and connected through gearing to the main driving shaft 37 carrying a pulley 30 connected by a belt 31 to a motor 32.

The said gearing is preferably in the form of a speed change gearing, and to this end we provide a gear 33 carried upon the sprocket shaft 28, this gear 33 being connected through an idler gear 34 to a driving gear 35 carried upon the intermediate driven shaft 36. This shaft 36 may be connected to the main driving shaft 37 through speed changing gears shown more clearly in Fig. 2 and which comprise small and large driving gears 38—39 on the main shaft 37 and corresponding gears 40—41 on the intermediate shaft 36. Gears 38—39 are carried upon a slidable sleeve actuated by a handle 42 so as to put either of the gear pairs 38—40 and 39—41 in mesh. It is to be understood that these gears may be readily changed so as to use different ratios to give desired speeds.

Now as to the die operating presses and carrying chains therefor, these are carried upon the sprocket pairs, there being a chain A carried upon sprockets 21—23 and a like chain B carried upon sprockets 22—24, the chains thus traveling together and comprising relatively long links oppositely disposed, that is each link of one chain is opposite a link of the other chain and each pair of links carries a press unit.

Figure 1:
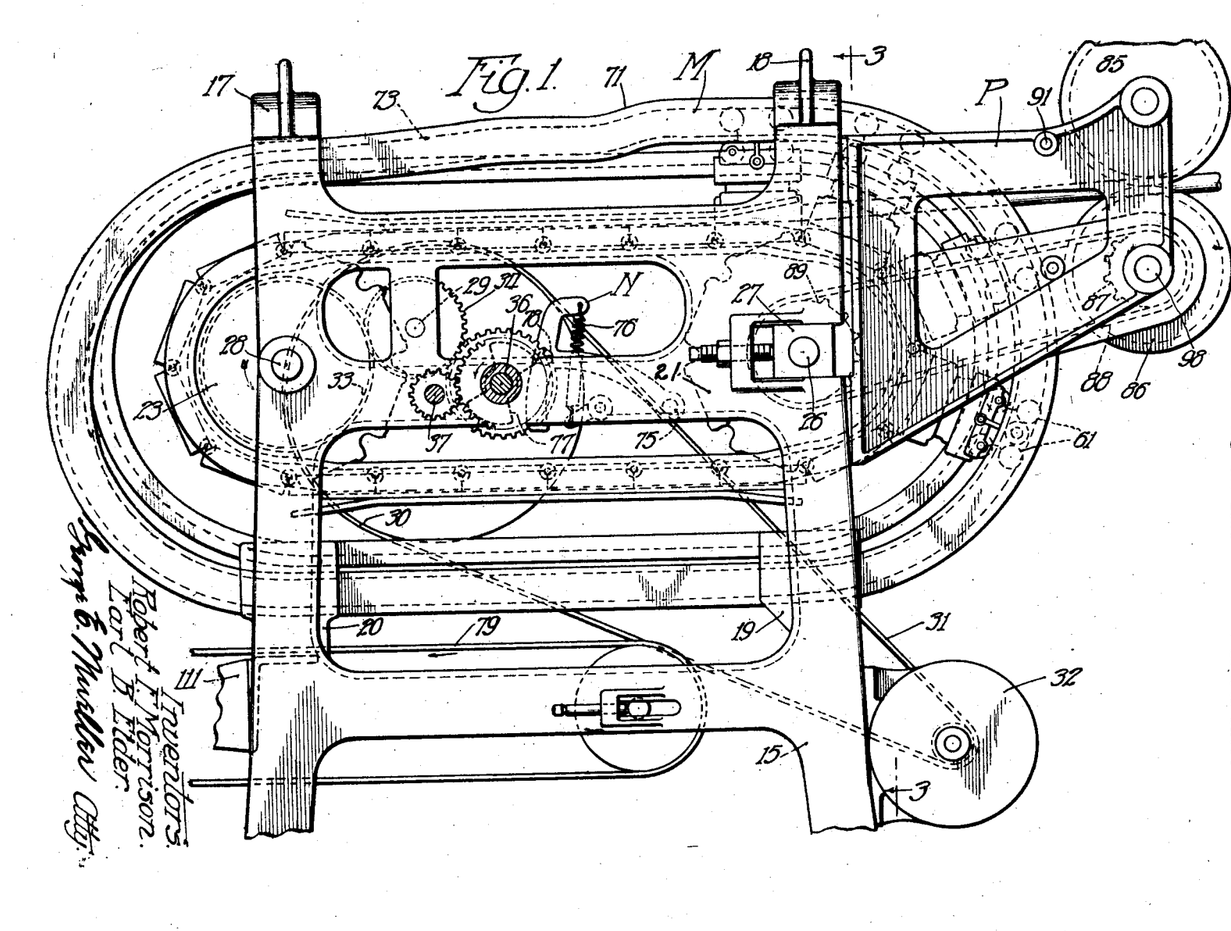
Fig. 1 is a side elevation of the preferred form of machine.

These press units are all of like construction and in the machine illustrated twenty presses are employed, there being one for each pair of links, although but four of the presses are shown in Fig. 1.

Figure 3:
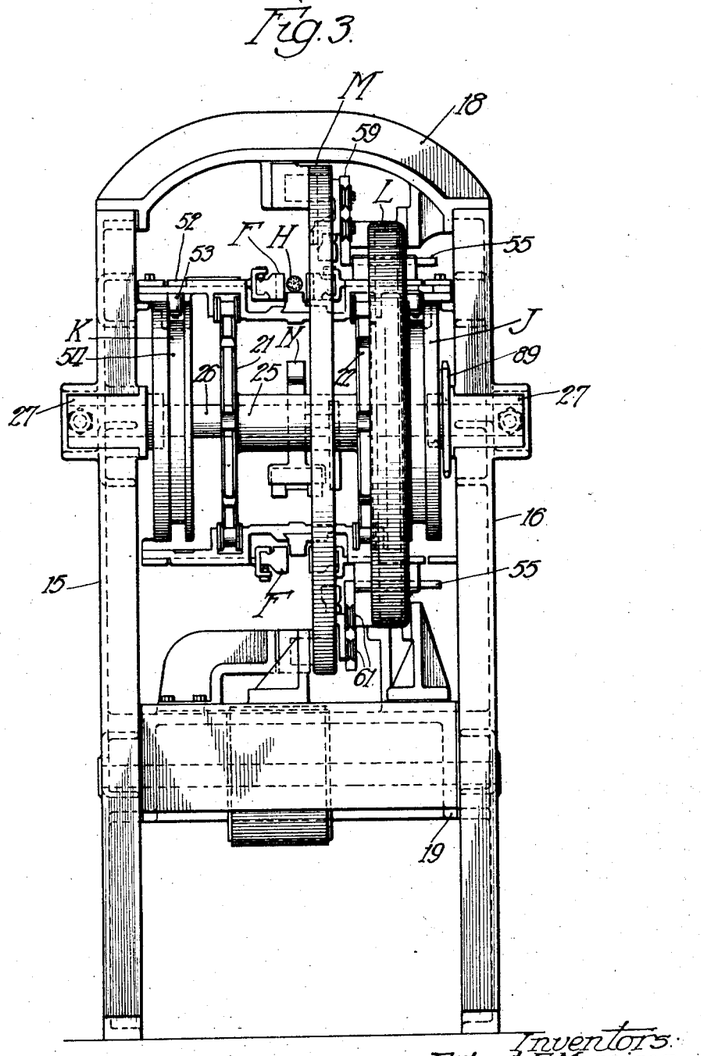
Fig. 3 is a right end elevation of Fig. 1 along the line 3—3 thereof, that is with the sizing rolls and brackets removed; and showing only the ends of the cams without attempting to show the transverse curvature.
Figures 4, 5:
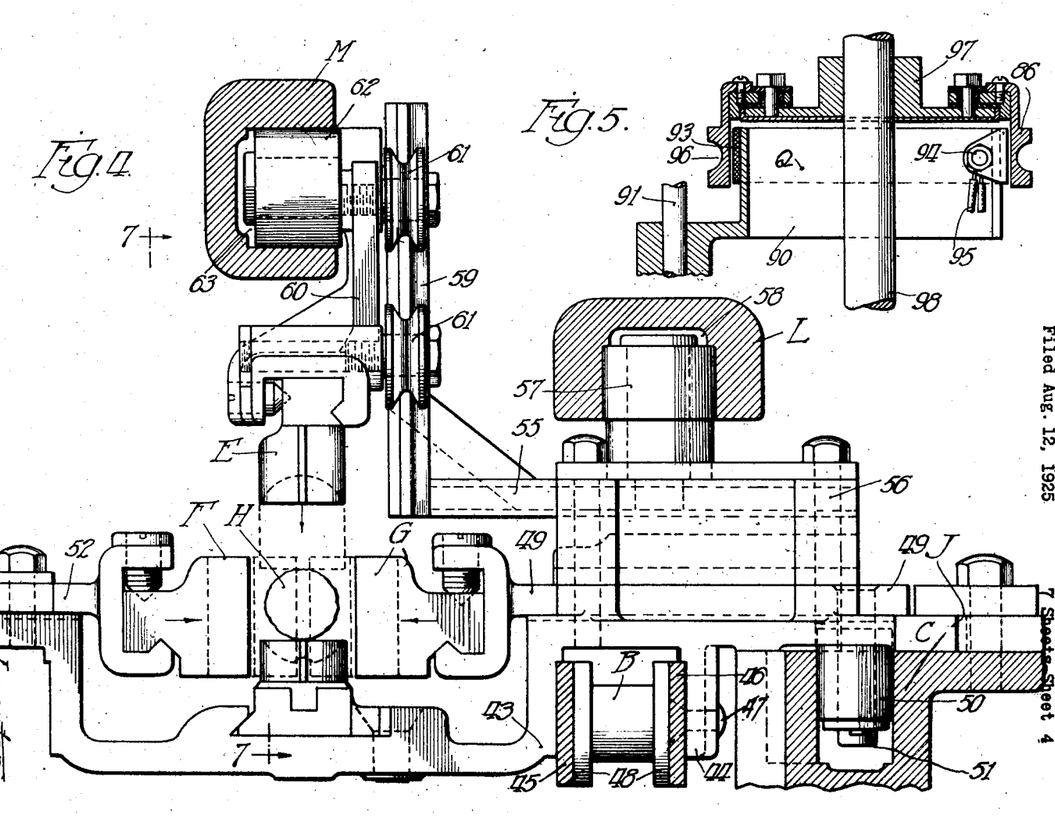
Fig. 4 is an enlarged view of one of the individual presses.
Fig. 5 is a sectional view through one of the sizing rolls, showing the electrical heating apparatus therefor.
Figure 6:
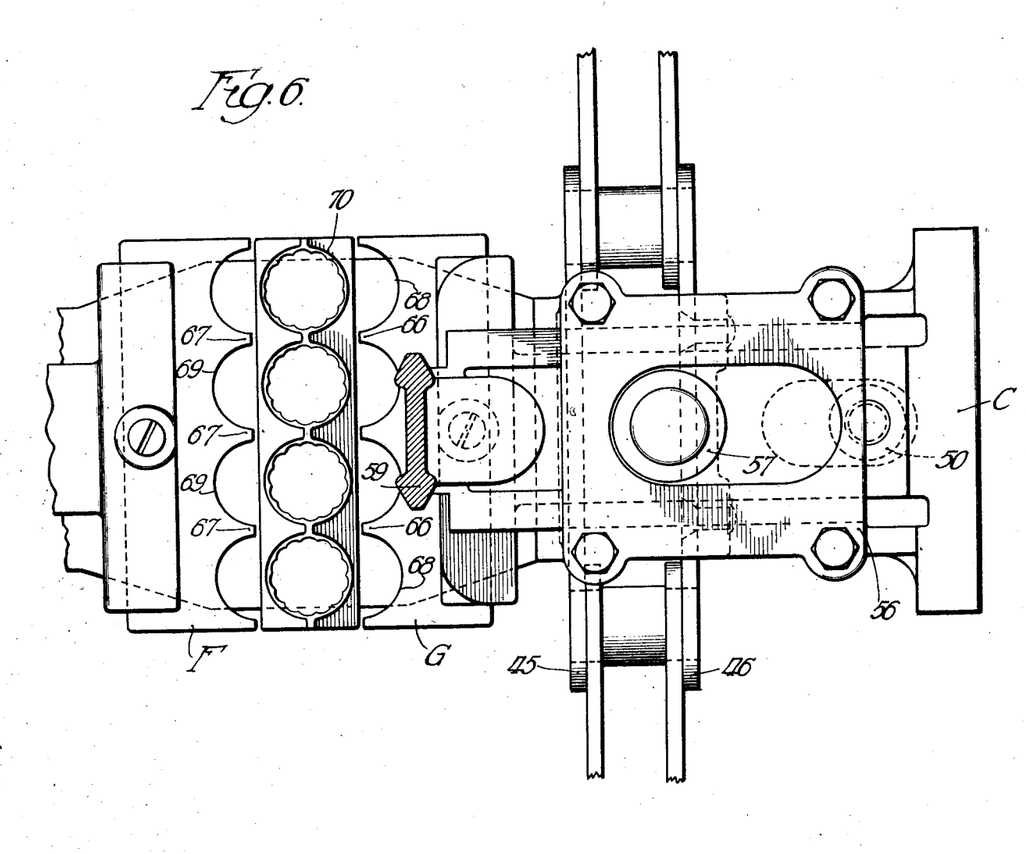
Fig. 6 is a top plan view of the mechanism of Fig. 4 passing in section through the upper die support and with the upper die and cam and also the cam ring removed.
Figure 7:
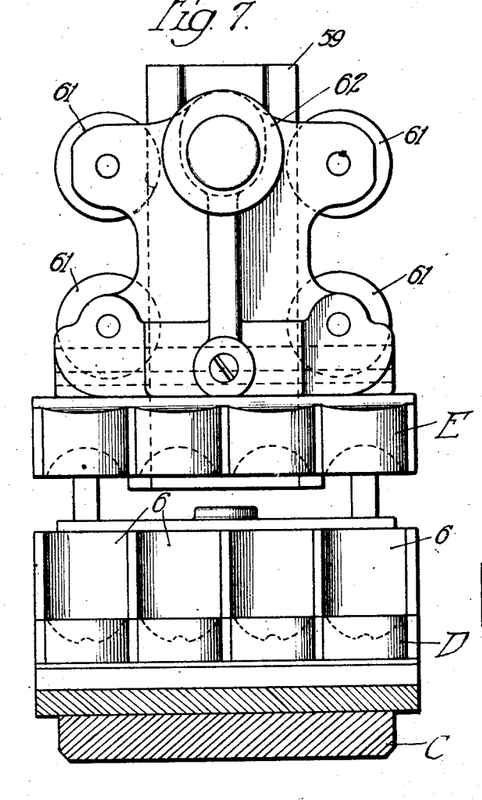
Fig. 7 is a right end view of the die unit of Fig. 4 looking in the direction of the arrows indicated at line 7—7 thereof and with the left hand transverse die removed.

Referring now more in detail to the press unit construction, we employ a main frame C extending across the chains, the frame C fitting down over each pair of links, as shown at chain B in Fig. 4. That is, the portions 43—44 of the frame fitting snugly down over the links 45—46 and riveted at 47 to one of the links. A like construction is employed for securing the other end of the frame C over the chain A. In Fig. 4 the left end of frame C is broken away, but its construction will be seen in Fig. 3. The outer ends of the frame C travel in guides J as shown in Fig. 4, so as to support the press frames between the sprockets and keep the chains from sagging.

In Fig. 4 the frame C is fitted down over the outside of a pair of sides of an outer link 45—46, but the next adjacent frame C would fit down over the inside blades or sides 48 of the link. That is, in the chain construction one pair of sides of the links alternate as inside and outside pairs of sides, one frame C dropping over the outside link and the next one over the inside link and so on around the entire chain.

Each press carries four gang dies, including a bottom inside die D, a top inside die E and side or outside dies F and G. These four dies are drawn together and act upon a candy rope H to compress it into desired shapes, the dies illustrated being arranged to form raspberries. The lower die D is stationary and removably clamped in the frame C. The side dies F—G are laterally movable, the die G being carried in a slidable holder 49 carrying a roller 50 traveling in the groove 51 of a stationary circular cam J. The slot 51 in this cam is such as to move the slide 49 and die G in to compress the candy and again withdraw it to release the molded piece. The opposite laterally movable die F is likewise supported upon a slide 52 carrying a roller 53 extending into the slot 54 of the cam K which is of the same form as cam J but oppositely disposed, so that the two dies F—G are simultaneously reciprocated. These outside dies F—G and the inside top die E are also readily removable by loosening the set screws in the forked ends of the die holders 49—52—60.

Thus the dies are readily interchangeable for dies of other contours so as to form candies of different shapes, as peanuts, etc. This makes for a simple operation as compared with prior continuous machines where the entire chains carrying the dies must be removed.

The top die E of the press unit and its carrying head have a transverse movement and also a vertical movement, the head end die being shown in Fig. 4 in a position above the candy rope, that is with the head in its out position. This double-movement head construction is one of the features of our invention, that is, that movement whereby this top die is reciprocated laterally or transversely so that it may clear the candy rope as the rope is fed to the presses, and then down onto the candy. That is, the presses travel above and below the candy rope in a circle and thus the head must be moved to one side to pass the rope and then moved over the rope so that the dies may be compressed. To this end the movable head or upper die support bracket includes a slide 55 supported in a block 56 extending up from the frame C, and said slide 55 having a roller 57 extending into the slot or groove 58 of the ring cam L. The slide 55 carries a vertical extension 59 for supporting the upper die carriage 60, which carriage is slidingly mounted on the member 59 through rollers 61. This carriage 60 supports a driving roller 62 traveling in the slot 63 of the stationary ring cam M shaped to effect vertical reciprocation of the die E. It is to be noted that cams M and L follow the same line of travel laterally, as will be clear from Fig. 2, so that the rollers 57 and 62 maintain the same lateral relative position to the slots and thus keep the roller 62 from being drawn out of the slot 63 as the roller 57 is moved through its slot 58 to reciprocate the slide 55 laterally.

In Figs. 6 to 9 we have shown the multiple or gang die construction more in detail, four dies being shown in each gang, although it will be apparent that more or less may be used, depending upon circumstances such as the shape of the candy, its size, etc.

In the operation of the die unit, and assuming that the head has been moved over into position as shown in Fig. 4 and the head or inside die E has been moved down into its dotted line position just inside the outside dies, the two outside dies F and G are now moved in to their fully compressed position as indicated by the dotted lines in Fig. 4, thereby compressing the rope H by reason of the dividing walls 66—67 (Fig. 6) coming together with the wall portions 68—69 tight up against the walls 70 of the stationary die D and top die E. We thus have the dies D, E, F and G in intimate contact so as to form a seal and prevent squeezing the candy out of the dies when the head die E comes down to its fully compressed position.

As previously stated, before the dies F and G were fully compressed the head die E had dropped to its dotted line position as shown in Fig. 4, so as to be in position between the side dies F and G before they come together. This aligns the dies before coming together and also provides a sealed chamber for the candy when the outside side dies F and G have come together.

Figure 8:
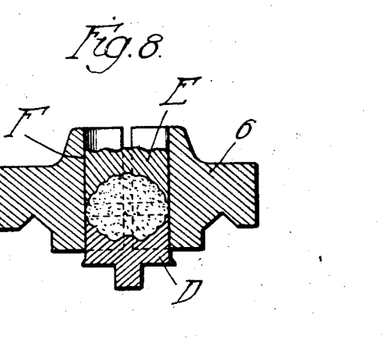
Fig. 8 is a transverse sectional view through one of the dies of Fig. 7 with the dies compressed.
Figure 9:
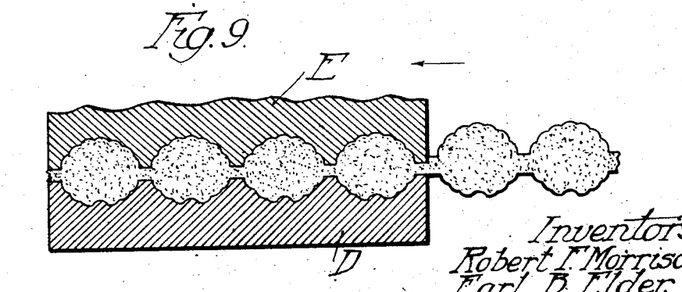
Fig. 9 is a longitudinal sectional view through the upper and lower dies fully compressed, the two candies at the right being of the next gang die which has not fully compressed.

Thus we have the side dies F—G together and the head die E in its dotted line position. The entire press, of course, is moving forward with the candy rope H all this time and the head die E is now moved downwardly between the side dies F—G until it is in its fully compressed position, as shown in Figs. 8 and 9.

Figure 2:
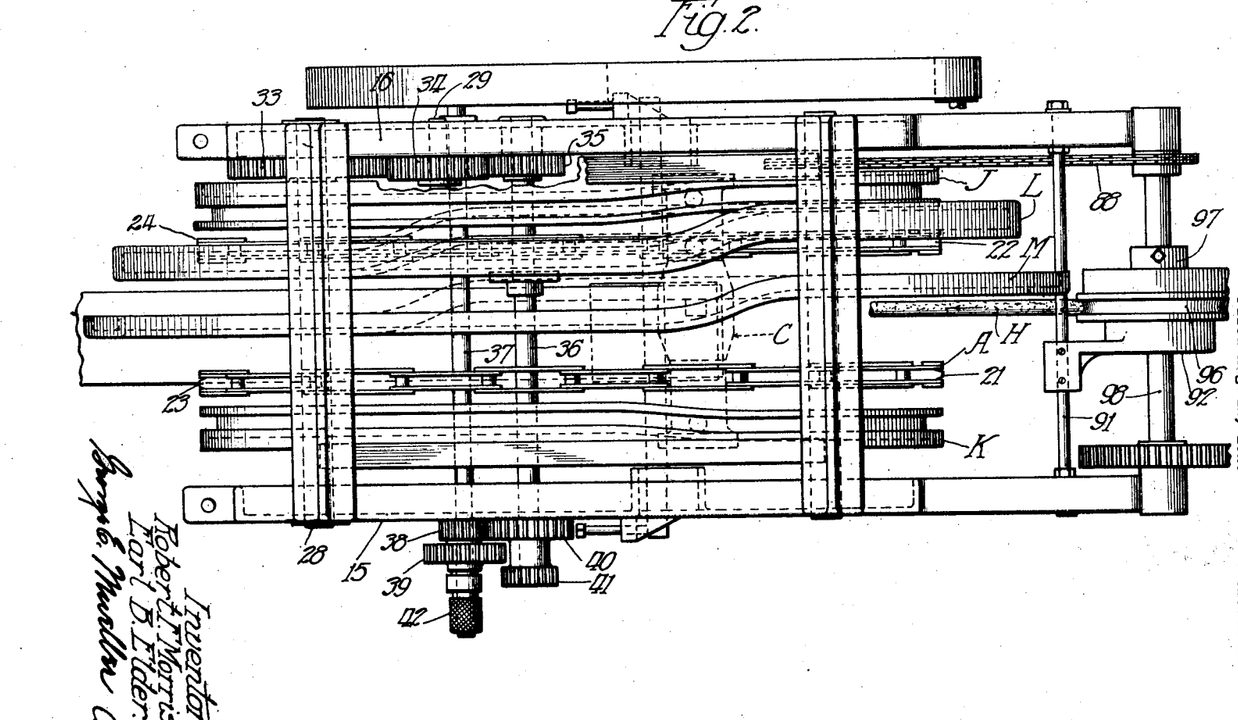
Fig. 2 is a top plan view of Fig. 1.

This movement of the side and head dies is brought about by the shape of the cams as indicated in Fig. 2, the lateral travel of the top die head in moving from its out to its in position being effected at the first top curve portion of the cams L and M. While this movement is taking place the side dies F—G start their inward travel, and as this inward travel is being effected the upper die E starts downwardly into its dotted line position of Fig. 4 by reason of the drop 71 in cam M (Fig. 1). The top die E then remains stationary for a short period while the side dies F—G are being moved into their fully compressed position, after which the top die E completes its downward movement through drop 73 of cam M (Fig. 1).

The dies having been fully compressed have now reached a point above the foot shaft 28 and start their downward travel, the head die being first gradually withdrawn by reason of the eccentric shape of cam M at the foot end, so that when the press has reached the bottom of the circle of cam M the head die E has been fully withdrawn. We now start the withdrawal of the side dies F—G by reason of the slots in cams J—K being shaped so as to pull these dies out and this outward movement is effected by reason of the outward travel of the slots of cams J—K along the bottom horizontal portions.

We might note at this time that before the outer dies F—G are withdrawn as stated, the top die head is drawn to one side after the top die E has been withdrawn from between the dies F—G, so as to clear the dies and permit the formed candies to be dropped down or released. This restoring or out movement of the top die head is brought about by reason of the cams L and M shifting back along the bottom as indicated by the dotted lines in Fig. 2.

Thus the dies have been fully withdrawn, as shown in the lower press in Fig. 3.

In the specific form of die arrangement shown, the inside dies are vertically disposed and the outside dies horizontally positioned so that the candy rope as it is fed to the machine rests on the plunger or inside dies. However, it is to be understood that the dies may be shifted so as to place the outside dies at the top and bottom and the inside or plunger dies to the side so that the candy rope will feed in and rest on the lower outside die.

In order to insure the release or dropping out of the formed candies after the dies have been opened up, we provide knock-out mechanism in the form of a hammer N (Fig. 1) pivoted at 75 and spring operated by the coil spring 76. The hammer is reciprocated in synchronism with the presses, that is operated so that it is released to hit each press as it comes along in its releasing position. This operation of the hammer is brought about by a cam 77 mounted upon the shaft 36, said cam being so timed that it lifts the hammer by engaging a stud 78 thereon and then disengages itself from the stud to permit the spring 76 to draw the hammer down and strike the dies a sharp blow. This drops the formed candies down onto a belt 79 located beneath the machine, by which they are taken away from the machine to a cooling distributor shown in Figs. 10—11.

Any other suitable removing means may be employed, as for instance a stationary plow rod positioned to be engaged by candies as the dies move along after being opened.

Referring now to the sizing rolls shown at the right end of Fig. 1, these are driven in synchronism with the machine so as to size the candy rope and assist the presses in drawing it into the machine. These sizing rollers are preferably heated so as to more effectively operate upon the candy rope. Two such rollers 85—86 are employed, being split so as to be readily removable and mounted upon a frame extension P, the lower or driving roller 86 having a sprocket 87 attached to its shaft and connected by a chain 88 to a sprocket 89 carried upon the press sprocket carrying shaft 26. The press carrying apparatus and roller 86 are connected so as to travel in synchronism, that is at the same angular velocity.

As previously stated, these rollers are preferably heated and to this end we employ an electrical heating unit Q shown in Fig. 5 and comprising a stationary drum 90 mounted upon a rod 91 extending between the sides of the frame P. This drum 90 is slotted at 92 and has a heating element 93 secured thereto by passing it around the drum and clamping it at 94, which clamping ends extend through the slot 92 into the interior of the drum so that the conductors as 95 may be connected to the terminals of the heating element. This heating element is thus inserted in the rollers and heats the forming portion in which the forming groove 96 is cut. The forming rollers are of a suitable metallic material and are heat insulatingly mounted upon a hub 97 which is attached to the carrying shaft 98. That is, suitable heat insulation such as asbestos is interposed between the roller 86 and the hub 97, so as to prevent the heat from being conducted away from the roller.

To remove the heating element Q from the roller the supporting shaft 91 is withdrawn and the clamping bolt 94 removed. The drum 90 can then be drawn out of the roller 86 and off of the shaft 98 by passing it over the shaft through the slot 92, which is wide enough to clear the shaft. In a like manner the parts may be again applied.

Figure 10:
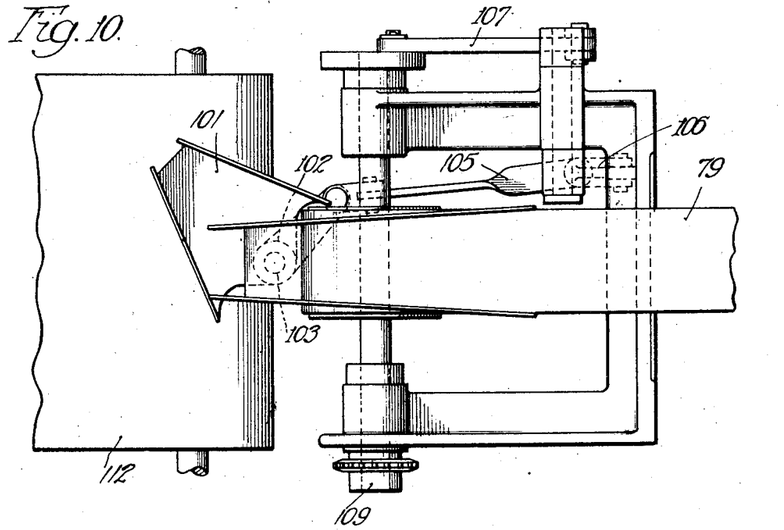
Fig. 10 is a top plan view of a distributor or candy spreader positioned beneath the receiving belt for spreading the candy onto a larger belt, so as to effect a quick cooling with a short belt.
Figure 11:
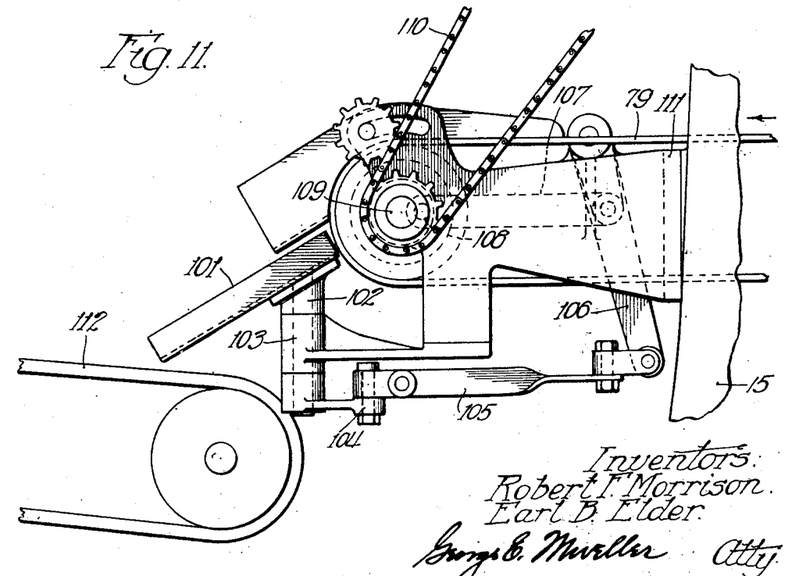
Fig. 11 is a front elevation of the mechanism of Fig. 10.

Referring now to the distributing mechanism shown in Figs. 10 and 11, this is located at the left end of the take-off belt 79 so that as the candies are carried to the end of this belt they drop into a swinging spout 101, which spout is mounted upon a shaft 102 carried in a bracket 103 and having an arm 104 at its lower end connected through a link 105 to a reciprocating arm 106 connected by a link 107 to a crank pin 108 rotated on the shaft 109 by a suitable sprocket and chain 110 driven from the main machine. This mechanism is all supported upon a frame 111 attached at the left or foot end of the main frame 15.

By the use of this reciprocating distributor the candies are spread out over a wider belt 112, which can thus run slower than the main belt 79 and may be of shorter length. This should be such as to give the candies sufficient time to harden and cool, and by reason of this distributing mechanism less space is required because the belt 112 may be shorter than if the narrow belt 79 were alone depended upon to carry away the formed candies.

What we claim as new and desire to secure by United States Letters Patent is:

1. A plastic candy forming machine including a plurality of unit presses each including a single frame carrying a plurality of coacting dies for completely forming candies, means for advancing said unit presses along to successively and repeatedly act upon a candy rope fed to the machine, and mechanism for successively actuating the dies of the presses to compress the candy rope to form candies as the presses are advanced.

2. A plastic candy forming machine including a plurality of unit presses each including a single frame carrying coacting top, bottom and side dies for completely forming candies, means for advancing said unit presses along to successively and repeatedly act upon a candy rope fed to the machine, and mechanism for successively actuating the dies of the presses to compress the candy rope to form candies as the presses are advanced.

3. A plastic candy forming machine including a plurality of unit presses each including a single frame carrying a plurality of coacting dies for completely forming candies, link-chain means for carrying said unit presses along to successively and repeatedly pass a given point to each time receive a successive portion of a candy rope fed to the machine, and mechanism for successively actuating the dies of the presses to compress the candy rope to form candies as the presses are advanced.

4. A plastic candy forming machine including a plurality of unit presses each having coacting transverse and perpendicular dies for completely forming candies and supporting means for each set of dies, rotatable means for rotatably advancing said unit presses over a circuitous path to successively and repeatedly act upon a candy rope fed to the machine and means for successively actuating the dies of the presses to compress the candy rope as the presses are advanced, said means including mechanism for temporarily moving said perpendicular die transversely to clear the rope as it passes whereby one of the perpendicular dies of each press is adapted to pass the rope being fed to the machine before the dies are compressed.

5. A plastic candy forming machine including a plurality of unit presses each having a unit frame carrying coacting transverse and perpendicular dies for completely forming candies and supporting means for each set of dies, rotatable means for rotatably advancing said unit presses over a circuitous path to successively and repeatedly act upon a candy rope fed to the machine and means for successively actuating the dies of the presses to compress the candy rope as the presses are advanced, said means including a transversely and perpendicularly movable die carrying head for temporarily moving said perpendicular die laterally to clear the rope and then over the rope and then perpendicularly to compress the same whereby one of the perpendicular dies of each press is adapted to pass the rope being fed to the machine before the dies are compressed.

6. A plastic candy forming machine including a plurality of unit presses each having a unit frame carrying a plurality of coacting dies for completely forming candies from a candy rope fed to the machine, means for advancing said press units over a single continuous path to successively and repeatedly receive the fed rope, and cam mechanism for successively and repeatedly operating the dies to completely form the candies as the candy rope is received.

7. A plastic candy forming machine including a plurality of unit presses each having a unit frame carrying coacting dies for completely forming candies from a candy rope fed to the machine, means for advancing said press units over a single continuous path to successively and repeatedly receive the fed rope, and cam mechanism for successively and repeatedly operating the dies to completely form the candies as the candy rope is received, said cam mechanism including ring cams coincident with the travel of the presses and cooperating portions for the dies engaging the cams for operation thereby.

8. A plastic candy forming machine including a plurality of unit presses each having a unit frame carrying a plurality of coacting dies for completely forming candies from a candy rope fed to the machine, means for readily removably supporting the dies on the frame for changing the dies to desired shapes without removing the frames, means for advancing said press units over a single continuous path to successively and repeatedly pass a given point to successively and repeatedly receive the fed rope, and cam mechanism for successively and repeatedly operating the dies to completely form the candies as the candy rope is received.

9. A plastic candy forming machine including a plurality of unit presses each having a unit frame carrying one fixed and three relatively movable coacting dies for completely forming candies from a candy rope fed to the machine, means for advancing said press units over a single continuous path to successively and repeatedly pass a given point to successively and repeatedly receive the fed rope, and cam mechanism for successively and repeatedly operating the three movable dies to completely form the candies as the cady rope is received.

10. A plastic candy forming machine including a plurality of unit presses each having a unit frame carrying one fixed and three relatively movable coacting dies for completely forming candies from a candy rope fed to the machine, means for advancing said press units over a single continuous path to successively and repeatedly pass a given point to successively and repeatedly receive the fed rope, and cam mechanism for successively and repeatedly operating the three movable dies to completely form the candies as the candy rope is received, said cam mechanism including three ring cams coincident with the travel of the presses, one for each movable die and shaped to actuate the dies to alternately close and open them to compress and release the formed candies during each circuit of travel of each press over its said path.

11. A plastic candy forming machine including a plurality of unit presses each having a number of relatively movable dies and a frame having relatively stationary portions for supporting the dies relatively movable, traveling chain mechanism supporting the frames in successive order and movable to carry the presses over the circuit of a continuous path so as to present the dies successively to successive portions of a candy rope fed to the machine, one of said dies having a circuit path of travel in a plane passing through the candy rope, its path of travel including a path below and above the rope, and means for moving said ones of the dies laterally to clear the rope in passing from below to above the rope and then back over the rope and thereafter operating the dies to compress the rope to completely form the candies.

12. A plastic candy forming machine for operating upon a continuous candy rope including front and rear paired sprockets, a pair of chains one for each pair of sprockets; a press frame spanning the chains and movable over a circuit path by said chains, dies for said press frame including a bottom, two lateral and a top die, means for transversely movably supporting the lateral dies in the frame, mechanism for transversely operating said latter dies for compression and retraction, a head for the top die, and means for operating said head laterally momentarily to clear the candy rope and perpendicularly to coact with the other dies to compress the candies.

13. A plastic candy forming machine for operating upon a continuous candy rope including front and rear paired sprockets, a pair of chains one for each pair of sprockets; a press frame spanning the chains and movable over a circuit path by said chains, dies for said press frame including a bottom, two lateral and a top die, means for transversely movably supporting the lateral dies in the frame, mechanism for transversely operating said latter dies for compression and retraction, a head for the top die, and means for operating said head laterally momentarily to clear the candy rope and perpendicularly to coact with the other dies to compress the candies, said operating means for the dies and die head including ring cams, one for each lateral die and one for the lateral movement and one for the perpendicular movement of the head.

14. A plastic candy forming machine including a plurality of unit presses, means for advancing said presses to successively operate upon a candy rope; each of said presses including a single frame, a bottom die carried by said frame, two lateral relatively movable compressing dies slidingly carried by the frame, a top die, and a head for carrying the top die, said head being transversely and vertically movably supported by said frame.

15. A plastic candy forming machine including a plurality of unit presses, means for advancing said presses to successively operate upon a candy rope; each of said presses including a single frame, a bottom die carried by said frame, two lateral relatively movable compressing dies slidingly carried by the frame, a top die, a support for the top die, transversely movably carried by and a slide with said top die support vertically movably carried thereon.

16. A plastic candy forming machine including a plurality of unit presses, means for advancing said presses to successively operate upon a candy rope; each of said presses including a single frame, bottom, top and lateral dies, supports for said dies carried by the frame having relative reciprocating movement to effect compression operation of the dies, and means for readily removably mounting the dies in said supports to permit changing dies for desired shapes without removing the die supports.

17. A plastic candy forming machine including a plurality of unit presses, means for advancing said presses over a continuous circuit path to successively operate upon a candy rope fed to the machine; each of said presses including top, bottom and two opposed lateral dies relatively movably supported upon a frame for compressing action; and means for operating the dies as the presses are advanced including cam mechanism for reciprocating the top die transversely to place it over the rope, then vertically to compress the rope, then back transversely to clear the die to permit discharge of the formed candies and hold it thus during advance of the press to clear the rope until the next compression operation.

18. A plastic candy forming machine including a plurality of die presses with means for advancing said presses to successively compress candies from a candy rope fed to the machine; each of the presses including a rigid frame, die holders relatively movably carried by the frame for cooperation to compress the dies, multiple dies carried by the holders for pressing out a plurality of candies for each operation, and means for so operating the die holders and dies carried thereby.

19. A plastic candy forming machine including a plurality of die presses with means for advancing said presses to successively compress candies from a candy rope fed to the machine, and knock-out mechanism for clearing the dies including a reciprocable hammer operated in synchronism with the presses for hitting a die of each press after the compression operation.

20. A plastic candy forming machine including presses for successively compressing candies from a candy rope fed to the machine, a rotatable cup shaped sizing roll for sizing the rope before being fed to the presses, and a stationary electrical heating unit positioned inside the roll for maintaining said roll at a desired temperature.

21. A plastic candy forming machine including a plurality of unit presses each having a unit frame carrying a plurality of co-acting dies for completely forming candies from a candy rope fed to the machine, means for advancing said press units over a single continuous path to successively and repeatedly receive the fed rope, cam mechanism for successively and repeatedly operating the dies to completely form the candies as the candy rope is received, and means for successively opening the dies after being operated to be operated to release the formed candies.

22. A plastic candy forming machine including a plurality of die presses with means for advancing said presses to successively compress candies from a candy rope fed to the machine; each of the presses including a rigid frame, die holders relatively movably carried by the frame for cooperation to compress the dies, dies carried by the holders for pressing out a formed candy for each operation, and means for so operating the die holders and dies carried thereby.

In witness whereof, we hereunto subscribe our names this thirtieth day of July, 1925.

ROBERT F. MORRISON.
EARL B. ELDER.